United States Patent [19]

Dämmig

[11] Patent Number: 5,796,635
[45] Date of Patent: Aug. 18, 1998

[54] DEVICE AND PROCESS FOR LINEAR MEASUREMENT OF FIBER SLIVER THICKNESS OR MASS

[75] Inventor: Joachim Dämmig, Ingolstadt, Germany

[73] Assignee: Rieter Ingolstadt Spinnereimaschinenbau AG, Ingolstadt, Germany

[21] Appl. No.: 681,178

[22] Filed: Jul. 22, 1996

[30] Foreign Application Priority Data

Aug. 8, 1995 [DE] Germany .................. 195 29 163.8
Oct. 16, 1995 [DE] Germany .................. 195 38 496.2

[51] Int. Cl.[6] .................................................. G06F 19/00
[52] U.S. Cl. ...................... 364/563; 364/470.15; 19/239
[58] Field of Search .......................... 364/563, 468.16, 364/469.01, 471.01, 470.13, 470.14, 470.15, 472.12, 571.01, 571.02, 571.03, 571.04, 571.07; 19/239, 240, 236, 237, 238, 294

[56] References Cited

U.S. PATENT DOCUMENTS

| | | | |
|---|---|---|---|
| 4,064,396 | 12/1977 | Panarello | 364/573 |
| 4,375,921 | 3/1983 | Morander | 356/381 |
| 5,230,125 | 7/1993 | Clement et al. | 19/236 |
| 5,384,934 | 1/1995 | Dämmig | 19/239 |
| 5,461,757 | 10/1995 | Leifeld | 19/239 |
| 5,485,082 | 1/1996 | Wisspeintner et al. | 364/571.06 |
| 5,583,781 | 12/1996 | Denz et al. | 19/236 |

*Primary Examiner*—James P. Trammell
*Attorney, Agent, or Firm*—Dority & Manning

[57] ABSTRACT

The invention relates to a process for rapid measurement of thickness or mass of a fiber sliver in a draw-frame or card (so-called "regulation"). The object of the invention is to accelerate the process of measuring according to the state of the art while maintaining measuring precision and even improving it. For this, a process for rapid measuring of the thickness or mass of a fiber sliver in a machine processing fiber slivers, such as a draw-frame or card, in which the primary measuring signal ($u_1$, $u_1'$) of the measurement indicator is taken via a signal-influencer which modifies the primary signal by segment or point before transmission in the form of measuring signal ($u_2$, $u_2'$); the modification is predetermined by a characteristic line stored previously by segment or point which is based on a relationship (K1) measured by point between defined predetermined thicknesses at the measurement indicator and the primary measurement signal ($u_1$ $u_1'$) measured at that moment.

11 Claims, 2 Drawing Sheets

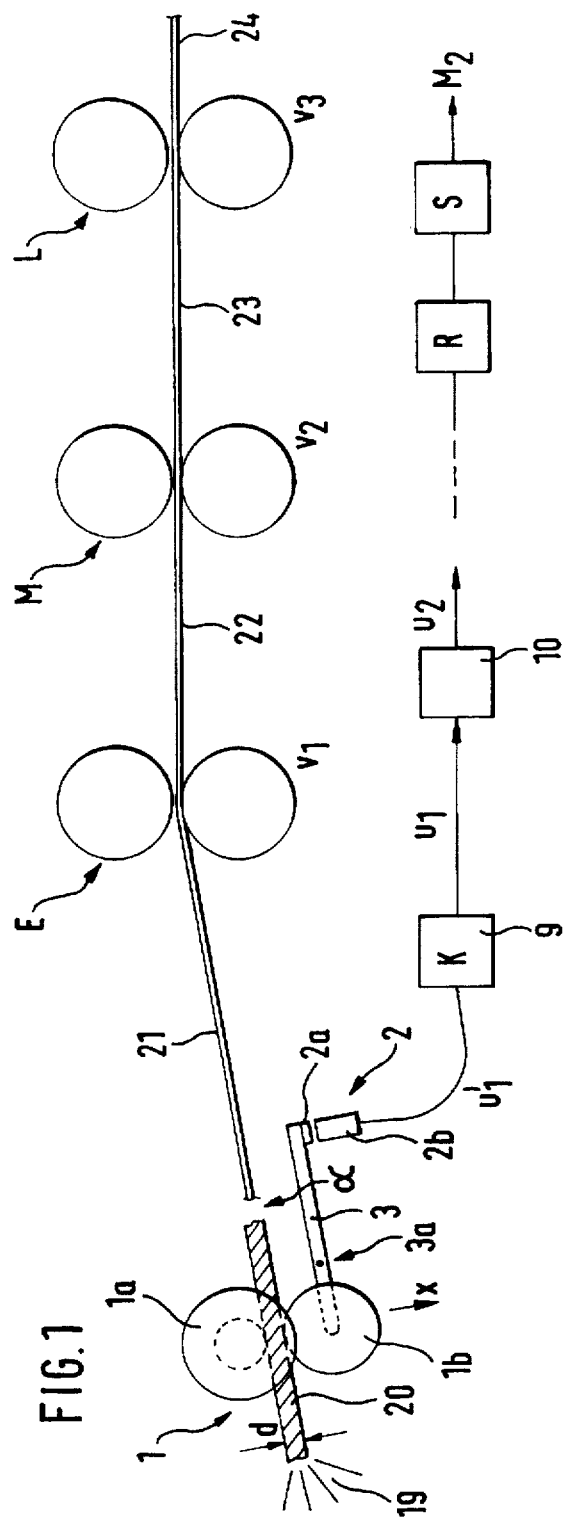
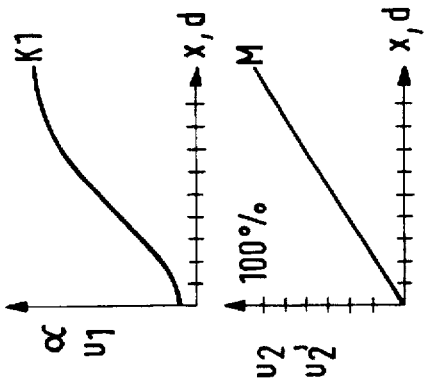
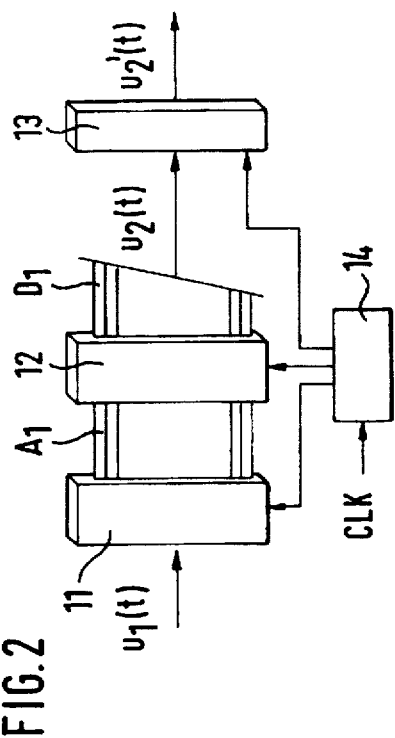
FIG. 1
FIG. 2
FIG. 3

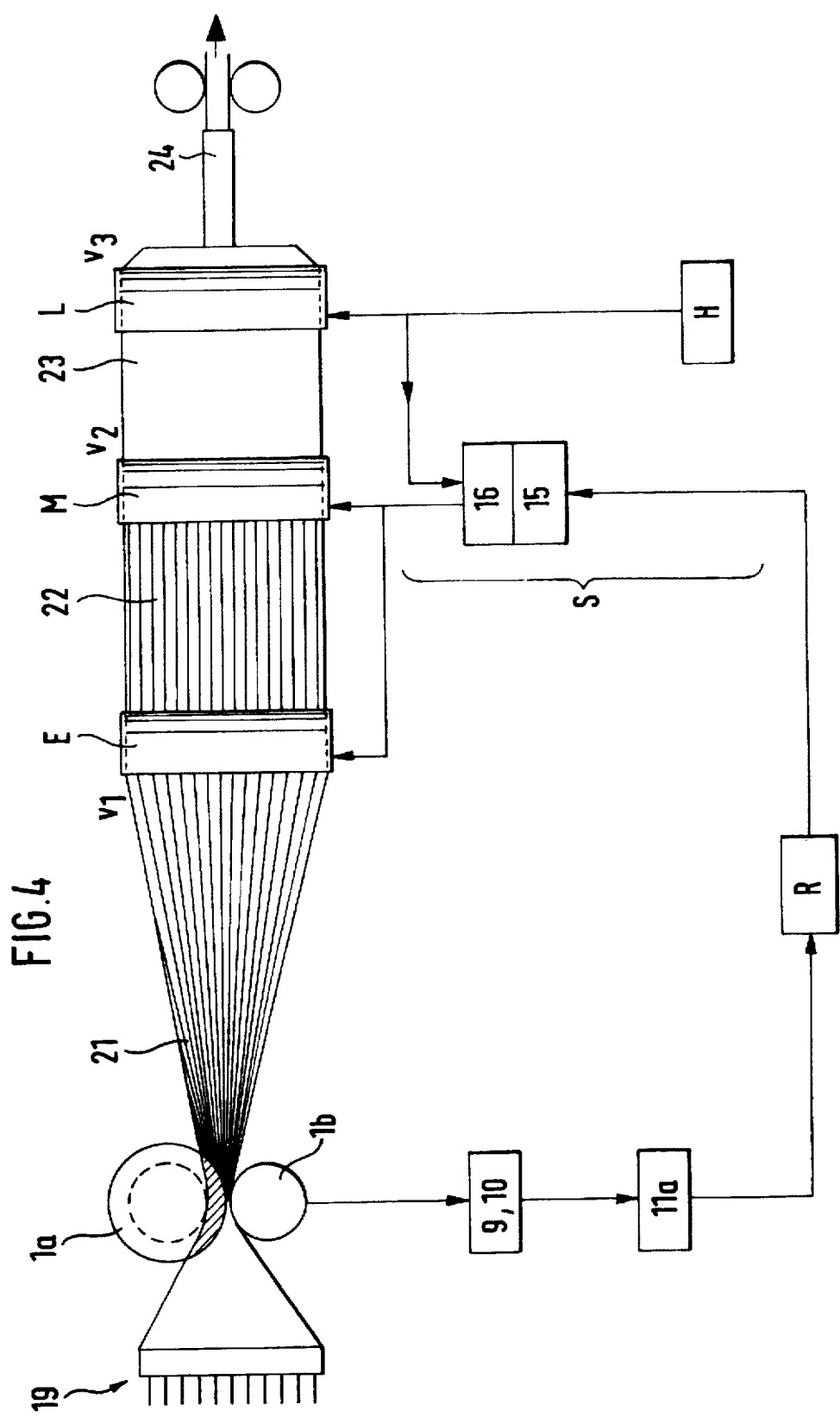

DEVICE AND PROCESS FOR LINEAR MEASUREMENT OF FIBER SLIVER THICKNESS OR MASS

BACKGROUND OF THE INVENTION

The technical area of the present invention is that of measuring devices, and in particular to a process and device for rapid measuring of thickness or mass of a fiber sliver in a draw-frame or card (so-called "regulation"), as well as a linearized influencing process for measured (as yet) non-linear signals.

In the above-mentioned machines processing fiber slivers, the presented slivers consisting of several fiber slivers generally run through a measurement indicator consisting of a rotatably mounted pair of scanning rollers. One of these two scanning roller is furthermore movable and is moved more or less relative to the fixed scanning roller by the fluctuations of the sliver mass, i.e. the thickness of the fiber sliver running through the scanning rollers while the width of the nip remains constant. These excursion movements are detected through a contact-less sensor and can be translated into an electrical measuring signal (a movable "target" is measured without contact for its distance from a fixed "distance indicator"). By means of this measuring signal, the card, for example, is influenced in its drafting zone in such a manner that the rollers (input roller, central roller) of the card are given different speeds when the different sliver mass reaches the drafting zone (between central roller and delivery roller). In practice this takes place over a changing running time (so-called "electronic memory") which transmits the measured value with appropriate delay to a desired-value step.

The above-mentioned measurements must be carried out rapidly at the high sliver velocities (e.g. in the range of 15 km/h<$v_L$<50 km/h), so that a high scanning frequency for the sliver thickness (mass) to be measured may be made available. Since a considerable amount of calculations usually follow the measurements, high-performance micro-calculators, micro-computers or signal processors, and if necessary floating-point computing chips must be made available.

OBJECTS AND SUMMARY OF THE INVENTION

A principal object of the invention is to accelerate the measuring process in a drafting apparatus and at the same time to maintain, or even improve, the precision of the measurement. Additional objects and advantages of the invention will be set forth in the following description, or may obvious from the description, or may be learned through practice of the invention.

The objects are attained by the invention if the primary measuring signal which originates with the measurement indicator is modified during operation on the basis of a previously stored characteristic line which is based on a relationship measured by points between a defined thickness on the measurement indicator and the primary measuring signal. The device which is suitable for this process contains a "circuit" (software technology or hardware-specific) in which a stored curve (function) or stored data words are contained which modify the measuring signal of the measurement indicator in such a manner that the output signal of the circuit is linear (with thickness changeable in a linear manner) even though the output signal of the measurement indicator and thereby the input signal of the circuit is non-linear. The stored contents of the circuit are based on a learning phase or steps preceding operation, which has been carried out for several thicknesses (so-called "test measurements", e.g. 3 mm, 4 mm, 5 mm and 6 mm). In these learning steps, the calculating-time-intensive computations have been carried out for which sufficient time is available in the pre-operation phase; the results of the computations only are stored and these are merely read out during operation, without it being necessary to make the computations again in the operating phase of the measuring device, when the machine is in operation and the fiber sliver is moved through the measuring device.

The pre-operation phase may occur one single time, until all necessary data words, or the curve which constitutes them, are obtained. Thereafter the measuring system is calibrated for any situation in operation, even without pre-operation phase, and must be brought again into a pre-production phase only when parts of the measuring system or of the measurement indicator are replaced or modified. In addition it is possible to re-calibrate if the user has doubts as to the measured magnitudes.

By scheduling the computation of the measuring signals before the actual operation phase ("in advance") and the production phase only carries out measurements which can be converted very rapidly through a table with respect to an offset or an upgrade, the invention makes it possible to accelerate and at the same time to linearize the measurement.

For these linearized measured values no expensive components are required, and conventional logic building blocks, if necessary an ASIC, are sufficient. Further treatment of the linearized measured values for programming purposes is simplified.

The precision with which the invention is achieved includes also the analog/digital transformer which is connected downstream of the measurement indicator and which makes the measuring signal available in digital form. Its characteristic line and its non-linearities are taken into consideration already in the computation of the data words in the pre-operation phase.

Multiplication and division is no longer required in real time and mathematical co-processors or signal processors for rapid handling of this multiplication and division while maintaining high precision can be dispensed with.

The linearity of the measurement indicator (e.g. "Target" and "distance indicator") which makes the analog measuring signal available, need not be paid special attention since its non-linearity is compensated for in any case through the fact that the circuit constitutes its reverse, so that the transmission function overall, starting from the thickness at input d(t) until the output signal $u_2(t)$ of the circuit which may be digital or analog, is linear.

The invention is explained and completed below through several examples of embodiments.

BRIEF DESCRIPTION OF THE DRAWINGS

FIG. 1 shows a representation of a fiber sliver movement for a draw-frame in which a scanning-roller pair 1a, 1b, roller 1b being movable, measures the thickness d of the presented sliver 20 which is composed of several individual fiber slivers 19. With the thickness measurement d(t) the mass m(t) of the fiber sliver (per length segment or time unit) is also known, because it is possible to base the calculation on a known specific weight and a known (or measurable) sliver speed.

FIG. 2 is an enlargement of the circuit 10 shown in FIG. 1, with its analog or digital element, as well as with a pulse generator 14.

3

FIG. 3 shows a non-linear transmission function K1 as $u_1=f(d)$, where d is parallel with x and perpendicular to the direction of the sliver speed. The output signal is generated by the measured-value indicator 1 of FIG. 1, whether the dependent variable is angle a or whether it is the electrical output signal $u_1'$ of an damping-measuring probe 2b. FIG. 3 shows also the linearized function M such as it appears for the overall measuring device with respect to the function $u_2=f(d)$ with the addition of the circuit of FIG. 1.

FIG. 4 shows the "regulating area" shown from the side in FIG. 1, with intake area 22 and drafting area 23 in a top view, the switching elements of FIG. 2 being shown.

DETAILED DESCRIPTION OF THE PREFERRED EMBODIMENTS

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield still a further embodiment. It is intended that the present invention cover such modifications and variations as come within the scope of the appended claims and their equivalents.

FIG. 4 clarifies the surrounding field in which the invention is to be explained through a diagram according to FIG. 2, although it is obvious that the hardware example of FIG. 2 can also be realized through programming if the control of logic operation is a program segment or a sub-program which operates with interrupt control and if the RAM or ROM 12 is a detail of a larger data memory of the processor.

FIG. 4 shows the draw frame area between the central roller M which rotates at a speed $v_2$ (circumferential speed) in operation and the delivery roller L which rotates at the speed $v_3$ (circumferential speed) and feeds the fiber sliver drafted in the drafting area 23 at a much higher speed from the draw frame in the form of fiber sliver 24 into a sliver storage. A flat fiber fleece as shown at 22 is supplied to the drafting area 23, it is fanned out by an input roller E rotating at a speed $v_1$ (circumferential speed) and which spreads out the fibers from a fiber bundle 21 for the central roller. Before the inlet roller is a scanning element 1a, 1b consisting of two rotating disks or rollers 1a, 1b facing each other which bundle together the combined fiber sliver composed of several fiber slivers 19 with great force and which make it possible to determine the thickness d, and thereby the fiber sliver mass. Following the scanning rollers 1a, 1b the fiber sliver is fanned out and formed to the width—under the action of the input roller E of the drafting area—which is fed to the central roller M and to the drafting area 23.

The scanning rollers 1a, 1b are shown as examples. Other measuring elements may be used here. Both scanning rollers 1a, 1b rotate, but one roller can be moved so that its distance from the other roller changes, as shown schematically in FIG. 1, and indicates its excursion via a lever arm 3 (characterizing the principle) through swivel articulation 23a to a target 2a the distance of which from an inductively functioning distance indicator 2b is set.

The output signal of the distance indicator 2b is transmitted to a measured-value memory 11a via a signal converter which may be a proportional element 9, said measured-value memory 11a then sets a predetermined time delay to the currently measured thickness signal $d(t_1)$ in order to change the speed $v_2$ of the central roller M and at the same time that of the input roller E via a desired-value

4 step R, the servo drive 15, and a planetary gear 16 so that the desired drafting takes place at a predetermined drafting point within the area 23. The main motor H drives the delivery roller L at the speed $v_3$, it also drives the planetary drive at that speed, so that the changes in thickness measured by means of the scanning roller 1b influence the speeds $v_2$, $v_1$ only as differential number via the servo drive 15 and the planetary gear 16, while the stationary state is adjusted so that the speed $v_3$ is a multiple of the speed $v_2$, $v_1$ but is stationary at an unchanged fiber thickness 19.

Because of imprecision and non-linearities in the signal path between the fiber sliver thickness d at the scanning rollers 1a, 1b and up to desired value step R, it is necessary to work with non-linear signal processing in order to control the regulation of the draw frame (the pre-control of speeds $v_2$ and $v_1$). Non-linearities affect the precision of regulation, they require long computation times and the installation of high performance computations during operation.

For this reason, the circuit 10 is provided as shown in FIG. 1, making linear thickness measuring possible with a still conventional measured-value indicator 1a, 3, 3a, 2a, 2b (hereinafter simply: 1, 2) and at a greater speed and with lower installed computation capability.

The change in measured value as per functional block 10 occurs e.g. in a model based on hardware technology as shown in FIG. 2. The still non-linear measuring signal $u_1(t)$ is transmitted to an A/D transformer 11 which emits an 8-bit signal for instance, interpreted as an address signal. With the address signal $A_1$ which is bit-parallel, the memory 12 which is a RAM or an EEPROM or a ROM buffered with a battery, is read out. It emits data words D1 which need not necessarily have the same bit width as the input bit width, but they can also be selected with 8 bits. The digital signal $u_2(t)$ is a time-discrete signal. The measured values from the memory 12 are read out by controls 14, which are controlled either with a fixed pulse or are synchronized with the rotational speed $v_3$ of the delivery roller L or the rotational speed $v_1$ of the input roller E or at the rotational speed $v_2$ of the central roller M. As a result, an operating mode is achieved which is length-oriented, with the interrupt-time of the computer depending on the speed of the fleece.

The data memory 12 contains data values which were determined before the actual operation of the draw frame serving here as an example in the explanation.

FIG. 3 shows how the contents of memory 12 are determined. A normally non-linear transmission function K1 results in part from the mechanical structure of the measured-value indicator 1, 2 (e.g. if a linear thickness change d of the bundled fiber sliver is not equal to a corresponding linear change in the distance between the target 2a and the distance indicator 2b, or if a linear change of in the distance between the target 2a and the inductively operating distance indicator 2b does not lead to a corresponding linear signal change $u_1$), and in part due to missing adjustment. To these non-linearities are also added offsets which may be due to thermic reasons, but which are unavoidable because of the structure, just as offsets which affect the A/D converter 11 itself. These non-linearities of which only examples are cited here, are represented in the non-linear characteristic line K1.

FIG. 3 shows the linearized characteristic line M which represents the entire transmission function, from the change in input thickness d of the sliver at the measured-value indicator 1, 2 to the output signal $u_2$, i.e. the transmission function $M=F\{u_2(t)/d(t)\}$. The reverse of the non-linear function K1 is thus stored in the data memory 12 in order to result again in a linear output $u_2(t)$ with a non-linear input which characterizes a linear change in the measured value $d(t)$.

The data words in memory 12 are ascertained in a pre-operation phase, when individual test measurements are put in the measured-value indicator 1, 2 and the corresponding output signal $u_1'$ is then found. Since it is known with the test measurements which output values are desired via the adaptation curve, the corresponding (still non-linear) measured value $u_1$ can be stored so that a computation basis is constituted in the pre-operation phase in order to determine in the memory 12 the function which leads to the linear output magnitude $u_2(t)$. This function has previously been designated as the "reverse" function, and "reverse" also contains an offset correction as well as an incrementation correction if the non-linear measured value $u_1'$ may be affected by all these errors.

As test measurements which are regularly supplied as a set for the start-up of a machine, dimensions of 3 mm, 4 mm and 6 mm are suitable, but a greater number of dimensions may be contained in this set, however these must be very precise in their dimension.

From the individual points, the system is able to calculate the data values of the memory 12 in the pre-operation phase, and these data values merely need to be read out in operation, since they already contain the non-linearities and are thus able to rapidly carry out linearization and conversion.

Insofar as only a few points are measured in the pre-operation phase (e.g. four) the system itself is able to form a form or curve by points with much higher resolution on basis of a linearization function if the sections or individual points are only known. For this, the program in the pre-operation phase uses linearization methods or offset compensation methods in order to obtain a reverse defined by points or a reverse defined by sections.

If a definition by points is selected, a corresponding data zone $D_1$ must be available over the entire address zone $A_1$. Although the resolution is high, so is the volume of the memory. If a reduced volume is selected with maintenance of sufficient precision, the sections of the address zone $A_1$ which are respectively associated with a data word $D_1$ can be combined. This may be accomplished by cutting off the bits of the address zone $A_1$ with the lowest value (representing the measuring signal $u_1'$).

The circumference calculations which takes place before the actual operation phase of the machine can be solved without time problems, since a high interrupt-frequency is not required before the actual operation of the machine. The computation time can thus be extended substantially, and processors can be used which do not require the high computation capabilities that would be required by a processor if it had to transform in operation the currently measured (non-linear) measured values $u_1'$ into linearized measured values or if it even had to transform the measured values taken from the distance indicator $2b$ only on the basis of known relationships (division and multiplication) into a measuring signal.

With the embodiment of this example, it is possible to place the conversion of the measured values based in the mechanism of the indicator as well as the linearization of these measured values before the operation of the machine. During operation, the system only has to read out the previously stored data points or sections (address zones) in order to provide the linearized and rapidly found measured signal $u_2(t)$.

In computing in advance the contents of the data memory 12, it is necessary, in order to achieve a high degree of precision, that one (or several) measured values be used first in order to first take the offset into account. Following this, the gradient can be calculated from the different measured values, with gradient and offset having both been taken into account. Several measurements or iteration processes can be used in order to calculate as precise a characteristic line as possible and store it in the memory 12 before the machine starts its actual operation. Before the operation of the machine, the computation capability and computation time are nearly unlimited, so that the measuring process is not subject to any restrictions in this respect.

The changes of the data stored in the data memory 12, which may either be an external memory or a storage area within the system, occur only very rarely, e.g. when a new scanning system is built in or if it is suspected that the distance measurement contains a software or hardware error. A distance measuring system which has once been built in (the indicator 1, 2 with its scanning roller $1b$, for example) is found again, individualized with the appertaining elements $2a$, $2b$, 9 and A/D transformer 11 in the function (the "reverse") in memory 12. Only when a measured-value indicator is newly installed is it necessary to readjust this function which is then found before start-up of the machine with the new distance measuring system in the manner described above.

It will be apparent to those skilled in the art that various modifications and variations can be made in the present invention without departing from the scope and spirit of the invention. It is intended that the present invention cover such modifications and variations.

I claim:

1. A process for measuring thickness characteristics of a fiber sliver in a textile fiber sliver processing machine wherein the sliver thickness characteristics are detected by a sensing device and acted upon by a control system for drafting the fiber sliver, the sensing device generating a normally non-linear measuring signal for linear changes in sliver thickness characteristics, said process comprising the steps of:

in a pre-operational phase of the tectile machine, determining data values from a predetermined number of test measurements input into the sensing device, the data values being calculated to generate a linear measuring signal from the sliver sensing device for linear changes in sliver thickness;

storing the data values in a memory in a control system of the textile machine;

in an operational phase of the textile machine, detecting sliver thickness characteristics with the sensor device which generates a non-linear measuring signal corresponding to linear changes in sliver thickness characteristics;

transmitting the non-linear measuring signal as an input signal to the memory and reading out corresponding data values stored in the memory so as to generate a linear output measuring signal for the non-linear input measuring signal; and transmitting the linear output measuring signal to the control system for drafting of sliver thickness variations in the sliver.

2. The process as in claim 1, wherein said step of determining data values includes calculating data values for a linear function from the data values determined for the predetermined number of test measurements.

3. The process as in claim 1, wherein said storing the data values in a memory includes storing the data values as digital values in a digital storage device.

4. The process as in claim 3, wherein said transmitting of the non-linear measuring signal includes transmitting the non-linear measuring signal as a digital address value to the memory and transmitting the linear output measuring signal as a digital output signal.

5. The process as in claim 1, wherein the stored data values define a function curve stored by points which applies an offset or gradient change to the non-linear input measuring signal resulting in the linear output measuring signal.

6. The process as in claim 1, further comprising repeating said pre-operational phase determining of data values when the sensing device is repaired or replaced.

7. A process for drafting in a textile machine, comprising:
in a pre-operational phase of the textile machine, calculating linear function data values for several known sliver thickness values corresponding to sliver thicknesses to be measured in an operational phase of the textile machine by a sliver thickness sensing device, the data values thereby establishing in advance a stored data for converting a non-linear measuring signal from the sensing device resulting from linear changes in sliver thickness into a linear measuring signal for the linear changes;

storing the pre-calculated linear function data values in a control circuit;

measuring with a sliver thickness sensing device actual sliver thickness of a fiber sliver fed to the textile drafting machine, and generating and transmitting an actual measuring signal from the sensing device to the control circuit;

generating a linear measuring signal from the actual measuring signal in the control circuit by correlating the pre-calculated linear function data values to the actual measuring signal; and drafting the fiber sliver with the generated linear measuring signal.

8. The process as in claim 7, wherein the actual measuring signal is a non-linear signal and the data values are computed as a reverse function of a non-linear measuring signal, the reverse function data values applied to the actual measuring signal to generate the linear measuring signal.

9. The process as in claim 7, wherein said calculating linear function data values includes generating data values for a linear function curve from the known sliver thickness values and storing the data values for the linear function curve in the control circuit, and said generating a linear measuring signal includes outputting stored data values corresponding to the input actual measuring signal without computation or changing of the actual measuring signal.

10. The process as in claim 9, further comprising storing the data values for the linear function curve in a memory in the control circuit and using the actual measuring signal as an address signal for reading out pre-stored corresponding linear data values.

11. The process as in claim 7, wherein said calculating linear function data values includes generating data values as a function of a non-linear actual measuring signal and storing the data values in the control circuit, and said generating a linear measuring signal includes applying the data values to the input actual measuring signal in a computation to generate the linear measuring signal.

* * * * *